United States Patent
Korn

(10) Patent No.: US 10,284,719 B2
(45) Date of Patent: *May 7, 2019

(54) SYSTEM, METHOD AND APPARATUS FOR CALL SCREENING

(71) Applicant: Stanley Korn, Culpepper, VA (US)

(72) Inventor: Stanley Korn, Culpepper, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,854

(22) Filed: Jul. 13, 2017

(65) Prior Publication Data

US 2017/0310822 A1 Oct. 26, 2017

Related U.S. Application Data

(63) Continuation of application No. 15/201,594, filed on Jul. 4, 2016, now Pat. No. 9,712,670, which is a continuation of application No. 14/084,465, filed on Nov. 19, 2013, now Pat. No. 9,386,149.

(60) Provisional application No. 61/747,882, filed on Dec. 31, 2012.

(51) Int. Cl.
*H04M 3/436* (2006.01)
*H04M 3/493* (2006.01)

(52) U.S. Cl.
CPC ......... *H04M 3/436* (2013.01); *H04M 3/4365* (2013.01); *H04M 3/4936* (2013.01); *H04M 2203/6072* (2013.01)

(58) Field of Classification Search
CPC .. H04M 3/436; H04M 3/4365; H04M 3/4936; H04M 2203/6072
USPC ................................. 379/71, 142.01, 142.06
See application file for complete search history.

(56) References Cited

U.S. PATENT DOCUMENTS

| | | | |
|---|---|---|---|
| 6,697,461 B1 * | 2/2004 | Middlesworth | H04M 3/436 379/221.08 |
| 9,226,159 B1 * | 12/2015 | Cao | H04W 12/12 |
| 2010/0246794 A1 * | 9/2010 | Gupta | H04M 3/436 379/210.02 |

* cited by examiner

*Primary Examiner* — Quynh H Nguyen
(74) *Attorney, Agent, or Firm* — Van Dyke Law; Raymond Van Dyke

(57) ABSTRACT

Techniques, systems, apparatuses and methods to better interdict or screen calls without disturbing the callee. The phone user can implement a warning for unwanted human, i.e., live person callers, and a challenge or barrier for unwanted automated or robocalling, particularly the usage of a required response to a question. The warning and particularly the challenge would weed out undesired solicitations. The present invention also makes allowance for desired human, robotic or automated calling in addition to the proscripted calls.

20 Claims, 2 Drawing Sheets

SYSTEM, METHOD AND APPARATUS FOR CALL SCREENING

RELATED PATENT APPLICATIONS

This application is a continuation of pending U.S. patent application Ser. No. 15/201,594, filed Jul. 4, 2016, now U.S. Pat. No. 9,712,670, issued on Jul. 18, 2017, entitled "System, Method And Apparatus For Call Screening," which is a continuation of U.S. patent application Ser. No. 14/084,465, filed Nov. 19, 2013, now U.S. Pat. No. 9,386,149, issued on Jul. 5, 2016, entitled "System, Method And Apparatus For Call Screening," and also claims priority from U.S. Provisional Patent Application Ser. No. 61/747,882, filed Dec. 31, 2012, entitled "Call Screening Phone," the disclosures of which are incorporated by reference herein in their entireties.

BACKGROUND OF THE INVENTION

Over the past century, the telephone has become an ubiquitous device used by the vast majority of humans across the planet. Telecommunications networks and other infrastructure have developed to support the mass communication between people. Over the last few decades, interconnectivity has increased and mobile phones and now smart phones are prevalent.

Also prevalent are advertisements and telemarketers who make incessant phone calls to potential or actual customers. With the great decrease in cost of phones and calling, the pace of telemarketing has increased. Further, telemarketers are not geographically bound to the region of their callees. Indeed, India and other English-speaking countries with cheap labor costs have increased the range of telemarketing substantially.

Concomitant with the rise in telecommunications capabilities is the enormous increase in automation, e.g., robocalling. Automated calls are employed in numerous contexts, such as politics and local government, but telemarketing usages prevail. The advantages of these calls for telemarketers are manifest, but the annoyance factor to those receiving unwanted calls, whether automated or live, is quite large. Prior art techniques to combat these calls are not adequate to interdict them, i.e., the robocalls tend to get through to the victims, whose only recourse is to hang up.

There is, therefore, a need for an improved technique to interdict unwanted calls, particularly robocalls, which preserves the normal functioning of the phone, and handles the undesired calls before ringing and disturbing the callee.

SUMMARY OF THE INVENTION

The present invention is directed to techniques, systems, apparatuses and methods to better interdict or screen calls without disturbing the callee. The phone user can implement a warning for unwanted human, i.e., live person callers, and a challenge or barrier for unwanted robocalling, particularly the usage of a required response to a question. The warning and particularly the challenge would weed out undesired solicitations. Of course, the present invention also makes allowance for desired human, robotic or automated calling in addition to the proscripted calls.

In this manner, the apparatus, system and methodology of the present invention can ease one of the more troubling side-effects of the present age, unsolicited phone advertising.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
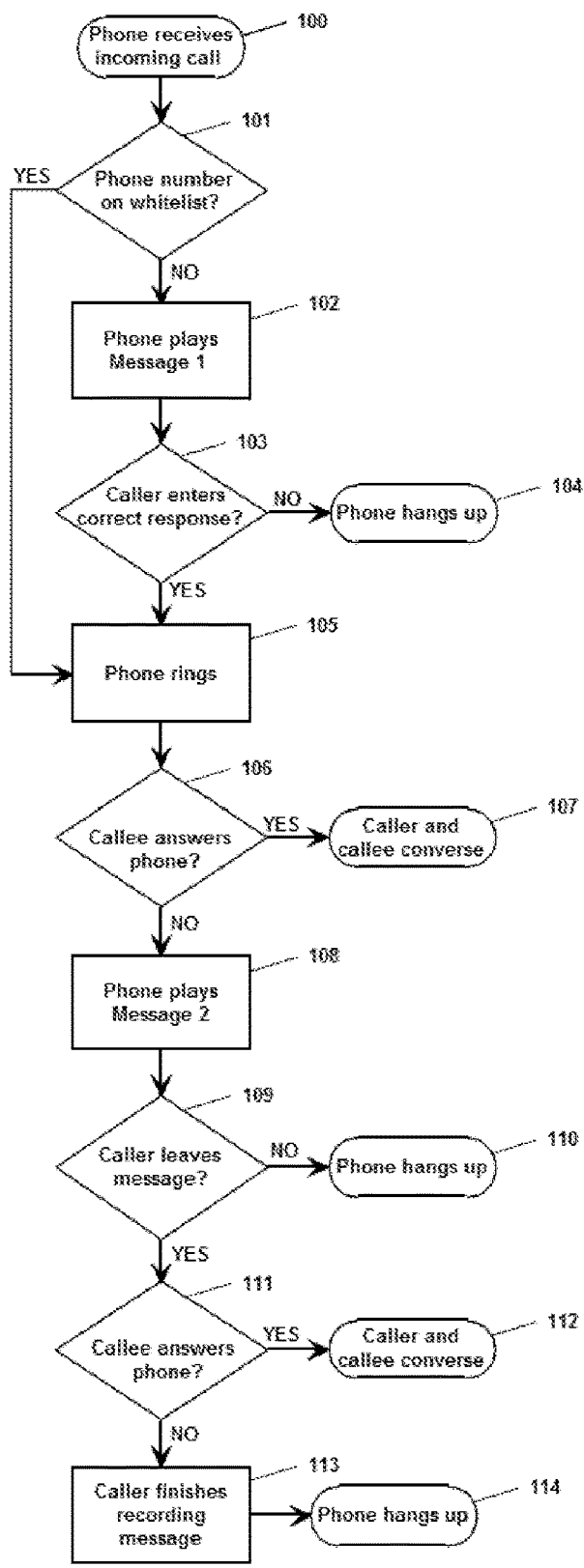
FIG. 1 is a flowchart view of an embodiment of a telephone screening methodology and configuration according the present invention.

With reference now to FIG. 1 of the DRAWINGS, there is illustrated therein a flowchart illustration of an embodiment of the call screening phone methodology and configuration of the present invention.

As illustrated, an incoming call, generally designated by the reference numeral 100, is received. A prerecorded message, generally designated by the reference numeral 101, is then played to the caller prior to the signal reaching the callee, i.e., the message 101 is played before the phone rings. As shown in FIG. 1, an incoming call, generally designated by the reference numeral 100, is received. The caller's phone number is checked against a whitelist or allowed list, generally designated by the reference numeral 101, which contains the phone numbers of all of the automated calling services desired by the user, such as for schools alerting parents about their children, a doctor alerting their patients about a visit or test results, a pharmacy alerting patients about their prescriptions, or road closings or other alerts regarding weather or danger. If the caller's phone number is contained in the whitelist, then the steps generally designated by the reference numerals 102, 103, and 104, described in detail hereinbelow, are bypassed, and the phone rings, generally designated by the reference numeral 105; otherwise, a prerecorded message, generally designated by the reference numeral 102, is then played to the caller prior to the signal reaching the callee, i.e., the message 102 is played before the phone rings.

The message 102 preferably has at least three parts, each with a distinct purpose. The first part identifies the callee, and is intended to screen out those callers who have mistakenly dialed the callee's number. The second part is a warning to telemarketers that the callee is not interested in receiving calls about products or services, particularly their offered products and services. The third and final part is a challenge question, requiring an answer, which is designed to interdict and block robotic or automated calls. This third part has the effect of also screening out calls made by children playing with the phone and dialing numbers at random.

It should be understood that the message may consist of various different phraseologies. An example of one message 102 implementing the above three parts is as follows:

> This is the John Doe residence. If you are calling to sell a product or service, ask for a donation, or conduct a survey, then we are not interested. Otherwise, enter the number of months in a year.

As indicated, the challenge question should have a numeric response, i.e., punching or entering a particular number or numbers. It should be understood that the particular answer to the challenge question may be stored in a memory, such as memory 210 in FIG. 2 of the DRAWINGS, for later reference in matching the caller's answer to the particular question, and either denying the call or allowing the phone to ring.

Figure 2:
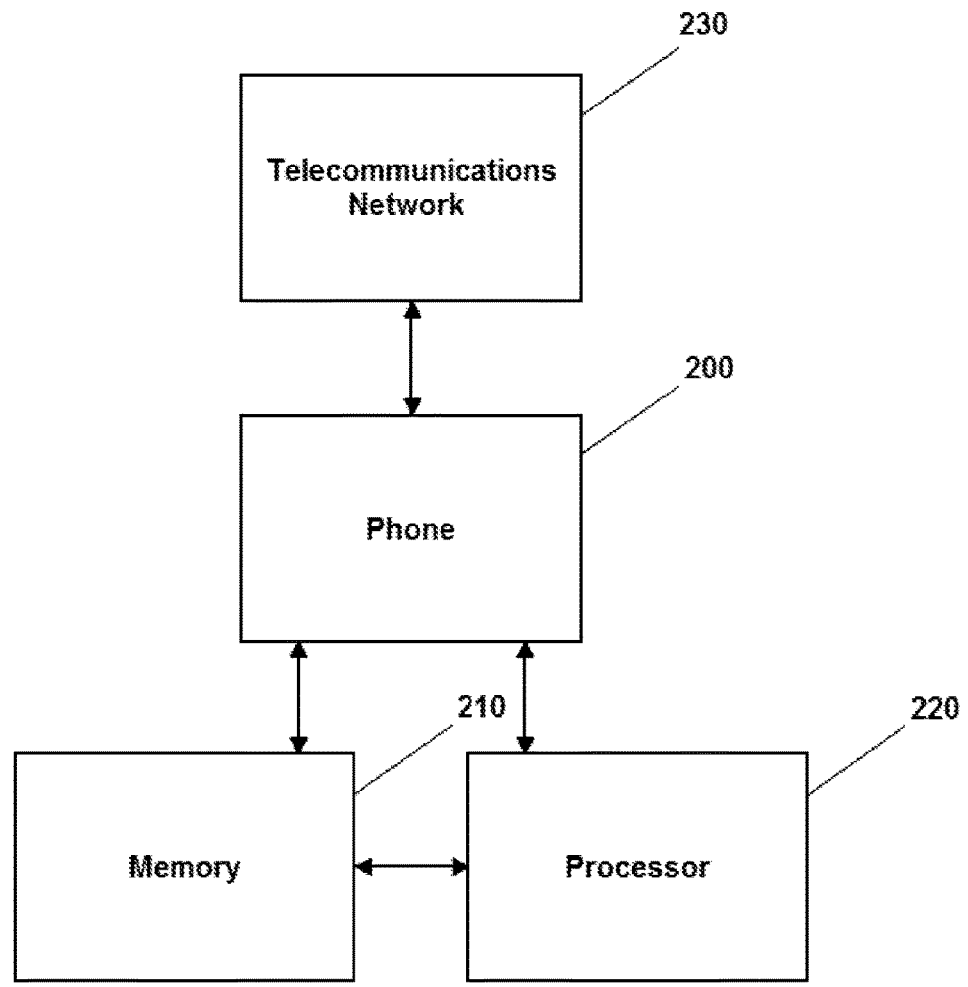
FIG. 2 is an illustration of a system and apparatus employing the principles of the present invention.

It should also be understood, however, that an oral response could alternatively be entered to answer the challenge question, i.e., "Twelve," and the present invention would have a processor, such as processor 220 in FIG. 2, to analyze and determine the sufficiency of the response, whether numerical, textual, oral or otherwise, e.g., graphical or visual. With the increasing sophistication of robocalling and artificial intelligence, the employment of such a complex verbal response may be necessary to combat robocalls.

For example, as shown in FIG. 2, a phone, generally designated by the reference numeral 200, has memory 210, which may include a program or algorithm therein to process speech. A processor 220 processes the answers, as discussed. As shown in FIG. 2, processor 220 is resident. Of course, the phone, either wireline or wireless, may have access to a processor elsewhere, i.e., not resident, to decipher spoken words, phrases, symbols, etc., and accord the response to the challenge question, e.g., across a telecommunications network, generally designated by the reference numeral 230. For example, an oral challenge question could be "Who was the Third President of the United States?" Unless the response is processed and ascertained to be "Thomas Jefferson" or "Jefferson" the answer is incorrect. It should also be understood that in another embodiment the caller may input text corresponding to the answer, such as "Jefferson" in letters, which the processor 220 would interpret and accord with the particular answer. It should be understood that memory 210 may contain the whitelist of approved callers or the list may reside elsewhere, accessible via the telecommunications network 230. It should be understood that texting and other such capabilities are within the purview of the instant invention, and the principles of the present invention readily applicable thereto.

Nonetheless, in most embodiments, a numerical response to the challenge question should suffice, at least for another decade. It should, of course, be understood, however, that verbal response challenge questions are also contemplated by the instant invention.

With reference again to FIG. 1, after playing the message 102, the caller may not answer the question, e.g., the robocall does not understand and fails to answer, or it (or perhaps a child) enters an incorrect response within the allotted time period, e.g., 5-10 seconds, as indicated by the decision, generally designated by the reference numeral 103. If there is no answer, then the call is terminated, generally designated by the reference numeral 104, without disturbing the callee, i.e., the call is entirely interdicted and there is no ring. The callee is left undisturbed and without the annoyance (or even awareness) of the unwanted call.

If the answer is correct, however, then the call goes through and the phone rings, generally designated by the reference numeral 105. From this point further the call screening phone operates like a phone with a built-in conventional answering machine.

For example, if the callee answers the ringing phone, generally designated by the reference numeral 106, then the caller and callee converse, generally designated by the reference numeral 107. If not, then after a preset number of rings, the phone plays another message prerecorded by the user, generally designated by the reference numeral 108, which directs the caller to leave a message as well as their information, generally designated by the reference numeral 109. If there is no message, then the phone hangs up, generally designated by the reference numeral 110. Otherwise, where the callee answers the phone while the caller is leaving the message, generally designated by the reference numeral 111, then the recording process is interrupted and the caller and callee converse, generally designated by the reference numeral 112. Otherwise, if the message is not interrupted, then the caller finishes the message, generally designated by the reference numeral 113, and the call terminates, generally designated by the reference numeral 114. It should, of course, be understood that the callee may listen to the recording message until the caller identifies themselves before deciding whether or not to answer the phone.

As indicated, robotic or automated calling, although generally unwanted by most users, may be desirable in certain circumstances, e.g., as part of a subscription service. One quite useful service is for schools alerting parents about their children, a doctor alerting their patients about a visit or test results, a pharmacy alerting patients about their prescriptions, or road closings or other alerts regarding weather or other danger-related issues. With the growing sophistication of such services and rise in automation, there may well be a need for many such robocalling-type services.

Preferred methods and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

The invention claimed is:

1. A telephone call screener for a telephone comprising:
   a warning message, said warning message stored in a memory, said warning message of a callee played upon receipt of an incoming telephone call of a caller, said warning message including a audible challenge question, said challenge question having a particular answer thereto,
   wherein said challenge question is a trivia question that human callers are capable of answering said challenge question with said particular answer, but non-human callers are unable to understand said challenge question and provide said particular answer thereto;
   wherein, if an answer is received from said caller that does not match said particular answer, the incoming telephone call is terminated prior to ringing said callee; and wherein, if an answer is received from said caller that matches said particular answer, the incoming telephone call is connected and rings to said callee, whereby said call screen apparatus screens out non-human telemarketer calls that the callee is not interested in receiving.

2. The telephone call screener according to claim 1, wherein, if there is no answer to said challenge question from said caller, the incoming telephone call is terminated prior to ringing said callee.

3. The telephone call screener according to claim 1, wherein said warning message includes a first part identifying said callee.

4. The telephone call screener according to claim 1, wherein said warning message includes a second part warning telemarketers of non-interest by callee.

5. The telephone call screener according to claim 1, wherein said warning message includes a third part comprising said challenge question.

6. The telephone call screener according to claim 1, wherein said particular answer is stored in a memory within said call screen apparatus.

7. The telephone call screener according to claim 1, wherein said particular answer is selected from the group consisting of: numerals, text messages, symbols, spoken words, and spoken phrases.

8. The telephone call screener according to claim 1, wherein, after playing said warning message, the callee is given a time period to enter said answer.

9. The telephone call screener according to claim 8, wherein said time period is about 5 to about 10 seconds.

10. The telephone call screener according to claim 1, further comprising:
a processor, said processor determining whether or not said answer from said caller matches said particular answer of said callee.

11. The telephone call screener according to claim 10, wherein said processor is resident.

12. The telephone call screener according to claim 10, wherein said processor is non-resident.

13. The telephone call screener according to claim 1, further comprising:
an answering machine.

14. The telephone call screener according to claim 1, further comprising:
a whitelist, wherein if the caller is on said whitelist, said incoming call is immediately routed through to said callee.

15. The telephone call screener according to claim 14, wherein said whitelist is preloaded into a memory connected to said call screen apparatus.

16. The telephone call screener according to claim 14, wherein said caller on said whitelist is selected from the group consisting of emergency telephone and text numbers, school telephone and text numbers, physician or health professional telephone and text numbers, a pharmacy telephone and text numbers, municipal or governmental telephone and text numbers, weather service telephone and text numbers, and other danger-related telephone and text numbers.

17. The telephone call screener according to claim 1, wherein said telephone is selected from the group consisting of a wireline telephone, a wireless telephone, a personal digital assistant (PDA), a smart phone, a mobile phone and other telecommunications devices.

18. A telephone call screening system comprising:
an answering device;
a warning message, said warning message stored on a memory, said warning message of a callee played to a caller upon receipt of an incoming phone call from said caller, said warning message including an audible challenge question, said challenge question having a particular answer thereto;
wherein said challenge question is a trivia question that human callers are capable of answering said challenge question with said particular answer, but non-human callers are unable to understand said challenge question and provide said particular answer thereto;
wherein, if there is no answer to said challenge question from said caller, the incoming telephone call is terminated prior to ringing said callee;
wherein, if an answer is received from said caller that does not match said particular answer, the incoming telephone call is terminated prior to ringing said callee;
and wherein, if an answer is received from said caller that matches said particular answer, the incoming telephone call is connected and rings to said callee,
whereby said call screen apparatus screens out non-human telemarketer calls that the callee is not interested in receiving.

19. The telephone call screening system according to claim 18, wherein, if there is no answer to said challenge question from said caller, the incoming telephone call is terminated prior to ringing said callee.

20. A method for screening incoming telephone calls from a caller to a callee comprising:
receiving an incoming telephone call from said caller at a screening device;
upon receipt of said incoming telephone call, said screening device plays a warning message to said caller, said warning message stored on a memory, said warning message including an audible challenge question, said challenge question having a particular answer thereto;
waiting for an answer from said caller;
wherein said challenge question is a trivia question that human callers are capable of answering said challenge question with said particular answer, but non-human callers are unable to understand said challenge question and provide said particular answer thereto;
wherein, if an answer is received from said caller that does not match said particular answer, the incoming telephone call is terminated prior to ringing said callee; and
wherein, if an answer is received from said caller that matches said particular answer, the incoming telephone call is connected and rings to said callee,
whereby said call screening device screens out non-human telemarketer calls that the callee is not interested in receiving.

* * * * *